US009009445B2

(12) United States Patent
Pan

(10) Patent No.: US 9,009,445 B2
(45) Date of Patent: Apr. 14, 2015

(54) MEMORY MANAGEMENT UNIT SPECULATIVE HARDWARE TABLE WALK SCHEME

(75) Inventor: Jesse Pan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 846 days.

(21) Appl. No.: 13/277,793

(22) Filed: Oct. 20, 2011

(65) Prior Publication Data

US 2013/0103923 A1   Apr. 25, 2013

(51) Int. Cl.
  *G06F 12/00* (2006.01)
  *G06F 12/10* (2006.01)
(52) U.S. Cl.
  CPC ...... *G06F 12/1027* (2013.01); *G06F 2212/654* (2013.01); *G06F 2212/684* (2013.01)
(58) Field of Classification Search
  USPC .................................. 711/137, 204, 206, 207
  See application file for complete search history.

(56) References Cited

U.S. PATENT DOCUMENTS

| 5,680,565 | A | 10/1997 | Glew et al. |
| 6,775,747 | B2 | 8/2004 | Venkatraman |
| 7,313,658 | B2 | 12/2007 | Henry et al. |
| 7,996,650 | B2 | 8/2011 | Eddy et al. |
| 2003/0018877 | A1 * | 1/2003 | Gaskins et al. ............... 711/207 |
| 2010/0332787 | A1 | 12/2010 | Grohoski et al. |
| 2011/0010521 | A1 | 1/2011 | Wang et al. |
| 2011/0107057 | A1 | 5/2011 | Petolino, Jr. |

* cited by examiner

*Primary Examiner* — Reginald Bragdon
*Assistant Examiner* — Hamdy S Ahmed
(74) *Attorney, Agent, or Firm* — Rory D. Rankin; Meyertons, Hood, Kivlin, Kowert & Goetzel, P.C.

(57) ABSTRACT

A system and method for efficiently handling translation look-aside buffer (TLB) misses. A memory management unit (MMU) detects when a given virtual address misses in each available translation-lookaside-buffer (TLB). The MMU determines whether a memory access operation associated with the given virtual address is the oldest, uncompleted memory access operation in a scheduler. If this is the case, a demand table walk (TW) request may be stored in an available entry in a TW queue. During this time, the utilization of the memory subsystem resources may be low. While a demand TW request is stored in the TW queue, subsequent speculative TW requests may be stored in the TW queue. When the TW queue does not store a demand TW request, no more entries of the TW queue may be allocated to store TW requests.

25 Claims, 5 Drawing Sheets

MEMORY MANAGEMENT UNIT SPECULATIVE HARDWARE TABLE WALK SCHEME

BACKGROUND OF THE INVENTION

1. Field of the Invention

This invention relates to computing systems, and more particularly, to efficiently handling translation look-aside buffer (TLB) misses.

2. Description of the Relevant Art

Modern microprocessors typically include two or three levels of cache hierarchy for a processor core or for multiple cores. Later levels in the hierarchy of the system memory may include access via a memory controller to dynamic random-access memory (DRAM), dual in-line memory modules (dimms), and a hard disk. Data from recently accessed external memory locations are stored within the multiple levels of caches. When the data is requested again, the data may be retrieved from the caches rather than from external memory.

The processor utilizes linear addresses when processing the accessed data. The linear addresses may also be referred to as virtual addresses. A virtual address space for the data stored in system memory and used by a software process may be divided into pages of a prefixed size. The virtual pages may be mapped to frames of physical memory. Mappings of virtual addresses to physical addresses may keep track of where virtual pages are loaded in the physical memory. These mappings are stored in a page table and this page table is stored in memory. A translation look-aside buffer (TLB) stores a subset of the page table.

The TLB may reside between a processor and a given level of the cache hierarchy. Alternatively, a TLB may reside between two levels of the system memory hierarchy. In use, the TLB is accessed with a linear address of a given memory access request to determine whether the TLB contains an associated physical address for a memory location holding requested data. If a mapping is not found within the TLB, then the address translation is performed by a lookup of the page table. This lookup process is referred to as a page table walk. The page table walk includes reading the contents of multiple memory locations and using them to compute the associated physical address. After the completed page table walk, the physical address is used to complete an associated memory access request and the linear address to physical address mapping is entered into the TLB.

The page table walk utilizes an appreciable amount of execution time, multiple accesses of the system memory and associated memory resources such as buses and ports. The page table walk may interfere with other memory access operations such as load and store operations that hit in the TLB. By acquiring resources from the memory system, the page table walk is able to reduce the performance of the other load and store operations. Speculative page table walks correspond to speculative memory access requests that missed in the TLB. The result of the speculative page table walk may be flushed at a later time, rather than committed and later retired. However, these speculative page table walks acquire memory system resources and further interfere with memory access requests that hit in the TLB.

In view of the above, efficient methods and mechanisms for efficiently handling translation look-aside buffer (TLB) misses are desired.

SUMMARY OF EMBODIMENTS OF THE INVENTION

Systems and methods for efficiently handling translation look-aside buffer (TLB) misses are contemplated. In one embodiment, a processor includes a memory management unit (MMU) with logic to detect when a given virtual address misses in each available translation-lookaside-buffer (TLB). The MMU may determine whether a memory access operation associated with the given virtual address is the oldest, uncompleted memory access operation in a scheduler within the processor. If this is the case, a demand table walk (TW) request may be stored in an available entry in a TW queue. During this time, the utilization of the memory subsystem resources may be low. The TW queue may store TW requests to be issued to memory and begin a corresponding page table walk process.

As long as a demand TW request is stored in the TW queue, subsequent speculative TW requests may be stored in the TW queue. A given limit may be set on a number of subsequent speculative TW requests to store in the TW queue. When the TW queue does not store a demand TW request, no more entries of the TW queue may be allocated to store speculative TW requests. Therefore, speculative TW requests may not interfere with memory access operations that hit in at least one available TLB.

These and other embodiments will be further appreciated upon reference to the following description and drawings.

Figure 1:
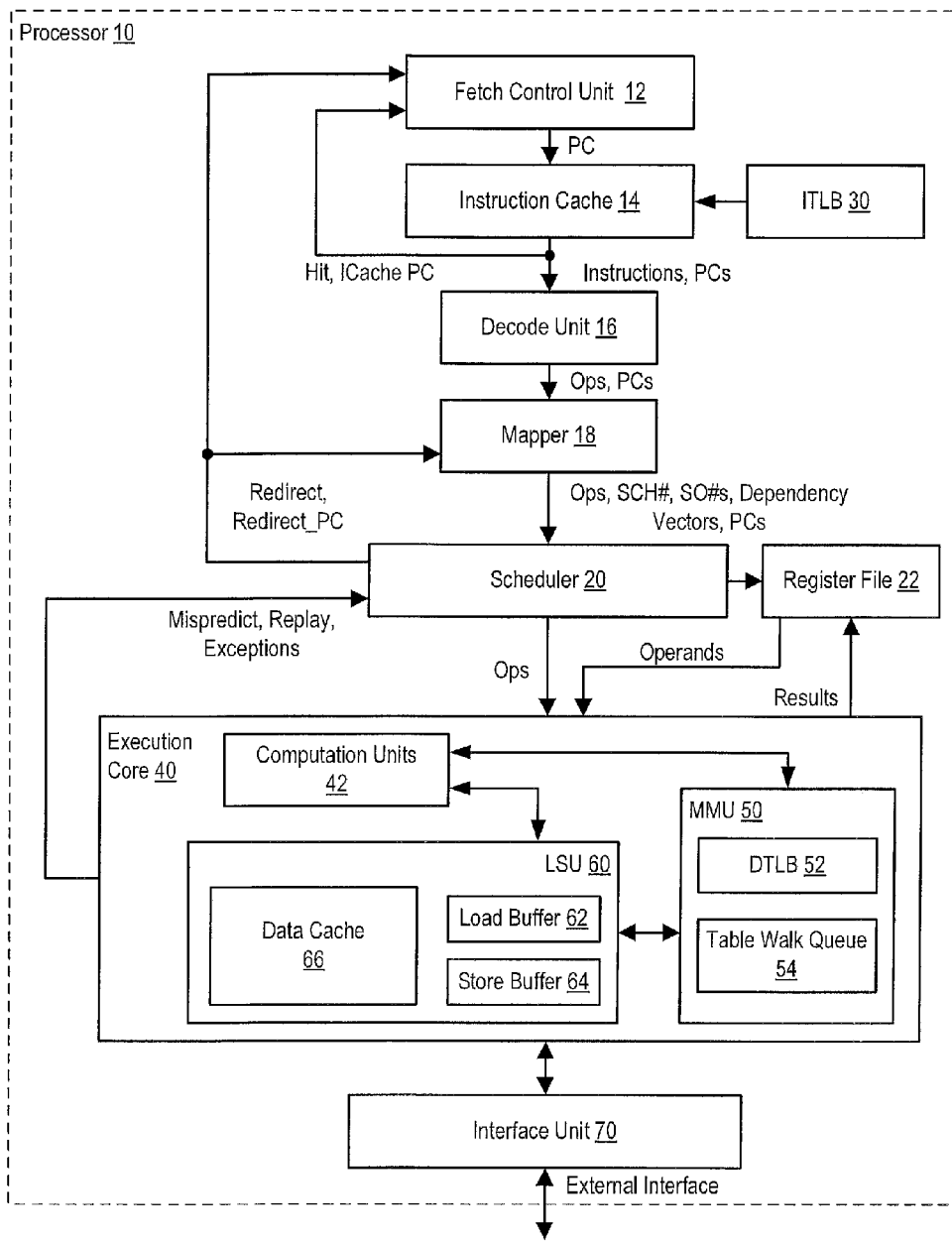
FIG. 1 is a generalized block diagram of one embodiment of a processor core that performs out-of-order execution.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Referring to FIG. 1, a generalized block diagram illustrating one embodiment of a processor 10 is shown. In the illustrated embodiment, the processor 10 includes a fetch control unit 12, an instruction cache 14, a decode unit 16, a mapper 18, a scheduler 20, a register file 22, an execution core 40, and an interface unit 70. The fetch control unit 12 is coupled to provide a program counter address (PC) for fetching from the instruction cache 14. The instruction cache 14 is coupled to provide instructions (with PCs) to the decode unit 16, which is coupled to provide decoded instruction operations (ops, again with PCs) to the mapper 18. The instruction cache 14 is further configured to provide a hit indication and an i-cache PC to the fetch control unit 12.

The mapper 18 is coupled to provide ops, a scheduler number (SCH#), source operand numbers (SO#s), one or more dependency vectors, and PCs to the scheduler 20. The scheduler 20 is coupled to receive replay, mispredict, and exception indications from the execution core 40, is coupled to provide a redirect indication and redirect PC to the fetch control unit 12 and the mapper 18, is coupled to the register file 22, and is coupled to provide ops for execution to the execution core 40. The register file is coupled to provide operands to the execution core 40, and is coupled to receive results to be written to the register file 22 from the execution core 40. The execution core 40 is coupled to the interface unit 70, which is further coupled to an external interface of the processor 10.

The execution core 40 includes computation units 42 for executing received ops according to associated opcodes. Examples of operations to execute include integer and floating-point arithmetic operations. The execution core 40 may also include a memory management unit (MMU) 50 and a load store unit (LSU) 60 for handling memory access operations. The memory access operations may include various types of integer and floating-point load and store operations.

The LSU 60 may include a load buffer 62, a store buffer 64 and a data cache 66. The load buffer 62 may store address information for load operations that have not yet committed. The load buffer 62 may store data information for the load operations when the load buffer 62 receives the data from a data cache, the store buffer 64, or a lower-level memory. The store buffer 64 may store address and data information for store operations that have committed, in order to facilitate load dependency checking.

The data cache 66 may store recently accessed data and one or more page tables with virtual-to-physical address translations. The LSU 60 may include one or more levels of a data cache. For example, the LSU 60 may include a level-one (L1) data cache (not shown) and a L2 data cache 66. A L3 data cache or other lower-level memory may be located off-die. Other combinations for a memory hierarchy are possible and contemplated.

The memory management unit (MMU) 50 may include at least one data translation-lookaside-buffer (DTLB) 52, which stores a recently accessed subset of the one or more page tables. In one embodiment, the execution core 40 includes two or more levels of DTLBs, such as a first-level DTLB and a second-level DTLB. In one embodiment, a first-level DTLB may be located in the LSU 60 and a second-level DTLB may be located in the MMU 50. In other embodiments, another number of levels of the DTLB may be used and a location of each one may be within the LSU 60, the MMU 50 or elsewhere within the execution core 40. The MMU 50 may also include a table walk queue 54.

The table walk queue 54 stores requests for a page table walk with each request associated with a respective memory access operation that missed in each available DTLB. In one embodiment, when a memory access operation is the oldest outstanding memory access operation in the scheduler and misses in each available DTLB, an available entry in the table walk queue 54 is allocated for the memory access operation. This allocated entry may store an indication that it holds a demand table walk request. In one embodiment, the table walk queue 54 may store only one demand table walk request. One or more subsequent speculative memory access requests that miss in each available DTLB may have an available entry allocated in the table walk queue 54. However, each of these allocated entries store an indication that an associated table walk request is speculative, rather than a demand table walk request.

A demand table walk request is associated with an oldest non-speculative memory access operation. In one embodiment, the table walk queue 54 stores a single demand table walk request. A second non-speculative memory access operation may be stored in the scheduler 20, but it is the second oldest or younger outstanding memory access operation stored in the scheduler 20. If this second non-speculative memory access operation misses in each available DTLB, it may wait to have an entry allocated in the table walk queue 54 until it is the oldest non-speculative memory access operation stored in the scheduler 20. In the meantime, speculative memory access requests stored in the scheduler 20 that miss in each available DTLB may have an associated entry allocated in the table walk queue 54 while a demand table walk request is stored in the table walk queue 54.

When the demand table walk request is issued to a page table and/or completed, the corresponding table entry in the table walk queue 54 may be deallocated. At this time, no speculative table walk requests may be allocated in an entry in the table walk queue 54. However, a subsequent memory access request that is now the oldest outstanding memory access request in the scheduler 20 and misses in each available DTLB may have an available entry allocated in the table walk queue 54. Further details are provided following the below description of the components within the processor 10.

Fetch control unit 12 may be configured to generate fetch PCs for instruction cache 14. In some embodiments, fetch control unit 12 may include one or more types of branch predictors. When generating a fetch PC, in the absence of a non-sequential branch target (i.e., a branch or other redirection to a non-sequential address, whether speculative or non-speculative), fetch control unit 12 may generate a fetch PC as a sequential function of a current PC value. For example, depending on how many bytes are fetched from instruction cache 14 at a given time, fetch control unit 12 may generate a sequential fetch PC by adding a known offset to a current PC value.

The instruction cache 14 may be a cache memory for storing instructions to be executed by the processor 10. The instruction cache 14 may have any capacity and construction (e.g. direct mapped, set associative, fully associative, etc.).

The instruction cache 14 may have any cache line size. For example, 64 byte cache lines may be implemented in an embodiment. Other embodiments may use larger or smaller cache line sizes. In response to a given PC from the fetch control unit 12, the instruction cache 14 may output up to a maximum number of instructions. It is contemplated that processor 10 may implement any suitable instruction set architecture (ISA), such as, e.g., the ARM™, PowerPC™, or x86 ISAs, or combinations thereof.

Processor 10 may implement an address translation scheme in which one or more virtual address spaces are made visible to executing software. Memory accesses within the virtual address space are translated to a physical address space corresponding to the actual physical memory available to the system, for example using a set of page tables, segments, or other virtual memory translation schemes. In embodiments of processor 10 that employ address translation, the instruction cache 14 may be partially or completely addressed using physical address bits rather than virtual address bits. For example, instruction cache 14 may use virtual address bits for cache indexing and physical address bits for cache tags.

In order to avoid the cost of performing a full memory translation when performing a cache access, processor 10 may store a set of recent and/or frequently used virtual-to-physical address translations in a translation lookaside buffer (TLB), such as Instruction TLB (ITLB) 30. During operation, ITLB 30 (which may be implemented as a cache, as a content addressable memory (CAM), or using any other suitable circuit structure) may receive virtual address information and determine whether a valid translation is present. If so, ITLB 30 may provide the corresponding physical address bits to instruction cache 14. If not, ITLB 30 may cause the translation to be determined, for example by raising a virtual memory exception.

The decode unit 16 may generally be configured to decode received instructions into instruction operations (ops). Generally, an instruction operation may be an operation that the hardware included in the execution core 40 is capable of executing. Each instruction may translate to one or more instruction operations which, when executed, result in the operation(s) defined for that instruction being performed according to the instruction set architecture implemented by the processor 10. In some embodiments, each instruction may decode into a single instruction operation. The decode unit 16 may be configured to identify the type of instruction, source and destination operands, etc., and the decoded instruction operation may include the instruction along with some of the decode information. In other embodiments in which each instruction translates to a single op, each op may simply be the corresponding instruction or a portion thereof (e.g. the opcode field or fields of the instruction).

Ops generated by the decode unit 16 may be provided to the mapper 18. The mapper 18 may implement register renaming to map source register addresses from the ops to the source operand numbers (SO#s) identifying the renamed source registers. Additionally, the mapper 18 may be configured to assign a scheduler entry to store each op, identified by the SCH#. In an embodiment, the SCH# may also be configured to identify the rename register assigned to the destination of the op. In other embodiments, the mapper 18 may be configured to assign a separate destination register number. Additionally, the mapper 18 may be configured to generate dependency vectors for the op. The dependency vectors may identify the ops on which a given op is dependent.

The mapper 18 may provide the ops, along with SCH#, SO#s, PCs, and dependency vectors for each op to the scheduler 20. The scheduler 20 may be configured to store the ops in the scheduler entries identified by the respective SCH#s, along with the SO#s and PCs. The scheduler may be configured to store the dependency vectors in dependency arrays that evaluate which ops are eligible for scheduling. The scheduler 20 may be configured to schedule the ops for execution in the execution core 40. When an op is scheduled, the scheduler 20 may be configured to read its source operands from the register file 22 and the source operands may be provided to the execution core 40. The execution core 40 may be configured to return the results of ops that update registers to the register file 22. In some cases, the execution core 40 may forward a result that is to be written to the register file 22 in place of the value read from the register file 22 (e.g. in the case of back to back scheduling of dependent ops).

The register file 22 may generally include any set of registers usable to store operands and results of ops executed in the processor 10. In some embodiments, the register file 22 may include a set of physical registers and the mapper 18 may be configured to map the logical registers to the physical registers. The logical registers may include both architected registers specified by the instruction set architecture implemented by the processor 10 and temporary registers that may be used as destinations of ops for temporary results (and sources of subsequent ops as well). In other embodiments, the register file 22 may include an architected register set containing the committed state of the logical registers and a speculative register set containing speculative register state.

The interface unit 70 may generally include the circuitry for interfacing the processor 10 to other devices on the external interface. The external interface may include any type of interconnect (e.g. bus, packet, etc.). The external interface may be an on-chip interconnect, if the processor 10 is integrated with one or more other components (e.g. a system on a chip configuration). The external interface may be on off-chip interconnect to external circuitry, if the processor 10 is not integrated with other components.

The execution core 40 may detect various events during execution of ops that may be reported to the scheduler. Branch ops may be mispredicted, and some load/store ops may be replayed (e.g. for address-based conflicts of data being written/read). Various exceptions may be detected (e.g. protection exceptions for memory accesses or for privileged instructions being executed in non-privileged mode, exceptions for no address translation, etc.). The exceptions may cause a corresponding exception handling routine to be executed.

The execution core 40 may be configured to execute predicted branch ops, and may receive the predicted target address that was originally provided to the fetch control unit 12. The execution core 40 may be configured to calculate the target address from the operands of the branch op, and to compare the calculated target address to the predicted target address to detect correct prediction or misprediction. The execution core 40 may also evaluate any other prediction made with respect to the branch op, such as a prediction of the branch op's direction. If a misprediction is detected, execution core 40 may signal that fetch control unit 12 should be redirected to the correct fetch target. Other units, such as the scheduler 20, the mapper 18, and the decode unit 16 may flush pending ops/instructions from the speculative instruction stream that are subsequent to or dependent upon the mispredicted branch.

The execution core 40 may include several arithmetic logic blocks within computation units 42. These arithmetic logic blocks may perform at least addition, subtraction, shifting, bitwise logic operations, rotation, multiplication, division, square root and/or other functions. The computation units 42 may perform both integer and floating-point arithmetic operations. The execution core 40 may include a data cache 66, which may be a cache memory for storing data to be processed by the processor 10. Like the instruction cache 14, the data cache 44 may have any suitable capacity, construction, or line size (e.g. direct mapped, set associative, fully associative, etc.). Moreover, the data cache 66 may differ from the instruction cache 14 in any of these details.

As with instruction cache 14, in some embodiments, the data cache 66 may be partially or entirely addressed using physical address bits. Correspondingly, a data TLB (DTLB) 52 within the memory management unit (MMU) 50 may be provided to cache virtual-to-physical address translations for use in accessing the data cache 66. A virtual address space for the data stored in system memory and used by a software process may be divided into pages of a prefixed size. The virtual addresses may also be referred to as linear addresses. The processing performed within the processor 10 may utilize linear addresses. The virtual pages may be mapped to frames of physical memory. The mappings of virtual addresses to physical addresses may keep track of where the virtual pages are loaded in the physical memory. These mappings are stored in a page table and this page table is stored in memory. The data cache 66 may have a copy of one or more page tables. The DTLB 52 may store a subset of the translations stored in one or more page tables.

The address translation and cache access may be performed in a manner similar to that described above with respect to ITLB 30. It is noted that although ITLB 30 and DTLB 52 may perform similar functions, in various embodiments they may be implemented differently. For example, they may store different numbers of translations and/or different translation information. Additionally, there may be multiple levels of the DTLB 52.

The computation of linear addresses, which are also referred to as virtual addresses, for load and store operations may take place within the computation units 42. In other embodiments, the LSU 60 may implement dedicated address generation logic. In some embodiments, the LSU 60 may implement an adaptive, history-dependent hardware prefetcher configured to predict and prefetch data that is likely to be used in the future, in order to increase the likelihood that such data will be resident in data cache 66 when it is requested.

The LSU 60 may include one or more buffers such as the load and store buffers 62-64 that store issued but not-yet-committed load and store instructions for the purposes of coherency snooping and dependency checking. The LSU 60 may include a miss buffer configured to store outstanding loads and stores that cannot yet complete, for example due to cache misses.

The MMU 50 may also include a table walk queue 54. For a given memory access operation, when a miss occurs in each level of the one or more levels of the DTLB 52, an associated page table walk request may be scheduled. The scheduled page table walk request may be stored as a table walk request in an entry within the table walk queue 54. However, allocation of page table walk (TW) requests in the table walk queue 54 may be performed in a manner to reduce contention between speculative table walks in cache 66 and accesses of data cache 66 for memory access operations that hit in the DTLB 52. Further details are provided after a brief description of the table walk process.

Figure 2:
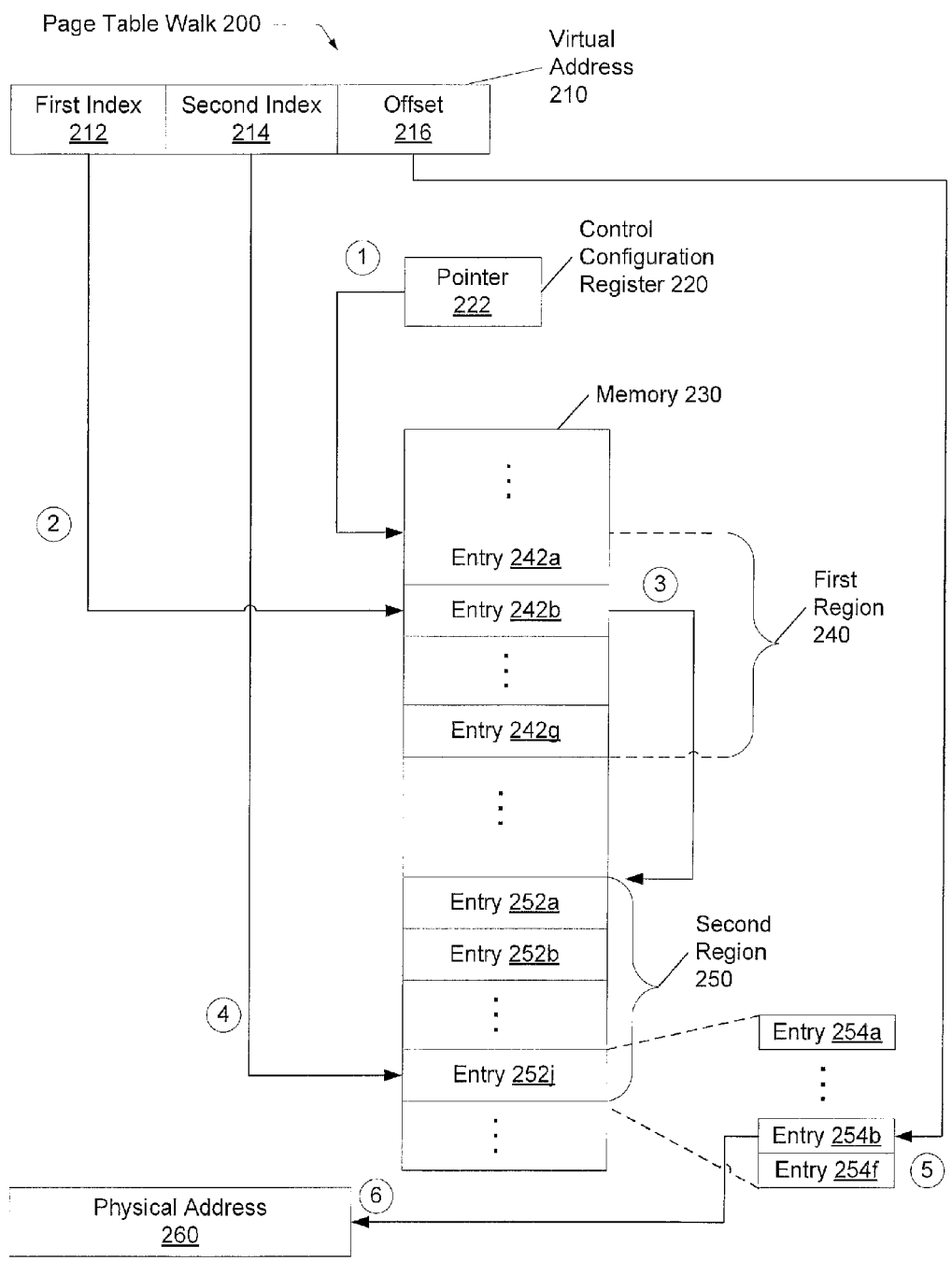
FIG. 2 is a generalized block diagram of one embodiment of page table walk process.

Turning now to FIG. 2, a generalized block diagram illustrating one embodiment of a page table walk process 200 is shown. As shown, a virtual address 210 is used to access a memory 230 in order to obtain address translation information stored in entry 254b. This address translation information may be used alone or combined with a subset of the virtual address 210 or other information to provide a translated address such as physical address 260. The translated address 260 may be used to index into a cache or another level of memory in a memory hierarchy.

The illustrated process is a generalized example. Page table walk mechanisms may include more values stored in configuration registers and/or tables such as translation table base registers, codes for different supported page table walk mechanism types, and codes for different formats for page table storage. A global descriptor table (GDT) may be accessed. A GDT is a data structure used to define characteristics of the various memory areas used during program execution. Each allocated memory block may be provided with a master descriptor describing the characteristics of the block. The characteristics may include a base address, the size, access privileges such as execution and modifying abilities, and whether the memory block is present in memory. When a request is made to access the block for reading or writing, the hardware may check its presence via the presence bit (pbit) in an associated descriptor.

Typically, a page table is 4 kilobytes (KB) in size and stores 256 entries with each entry storing 32 bits of address translation information. However, other sizes and configurations are possible and contemplated. For example, the memory 230 may be a data cache and each cache line may store one, two, or another number of page table entries. In one embodiment, each stored page table entry in a cache line may correspond to a different page table. The circled numbers in FIG. 2 depicts an ordered sequence of events. This sequence is used in an example below.

In the example shown, a control configuration register 220 stores a pointer value 222 used to index the memory 230 in sequence 1. The pointer value may be a page table base value or point to a page table directory. This portion of memory 230 pointed to by the pointer value 222 is generally referred to as the first region 240 in the illustrated example. The first region 240 may include entries 242a-242g. In sequence 2, the first index 212 within the virtual address 210 may be used to index into the first region 240. The first index 212 may index in a forward or a backward direction into the first region 240. The first index 212 may point to entry 242b within the first region 240.

In sequence 3, a pointer value stored in entry 242b may identify the second region 250 in the memory 230. The second region 250 may include entries 252a-252j. In sequence 4, the second index 214 within the virtual address 210 may be used to index into the second region 250. The second index 214 may index in a forward or a backward direction into the second region 250. The second index 214 may point to entry 252j within the first region 250. Each of the entries 252a-252j may include further entries. For example, entry 252j includes entries 254a-254f. In one embodiment, each of the entries 252a-252j is a separate page table and each of the entries 254a-254f is a page table entry.

In sequence 5, the offset 216 within the virtual address 210 may be used to index into the entry 252j. The offset 216 may index in a forward or a backward direction into the entry 252j. The offset 216 may point to entry 254b within the entry 252j. In sequence 6, the physical address 260 is read from entry 254b. In one embodiment, the address translation is complete. In another embodiment, the translation information from entry 254b may be combined with other information before the address translation is complete.

The page table walk process may consume a considerable amount of execution time and utilize two or more separate accesses to the memory 230 and/or another memory at a lower level in the memory hierarchy. The DTLBs generally have low miss rate and a long miss latency penalty. The lower miss rate results from the locality of memory access operations tend to stay within a page for a considerable period of time and a considerable number of fetches before fetching from a new page. The long miss latency penalty results from multiple references to the page table data structure for a page miss. Due to the low miss rate, the page tables may miss in the memory 230, which may be a L2 cache, much of the time. Even if a cache line accessed within the page tables was previously brought to the L2, such as for a previously referenced descriptor or translated information, this cache line may be likely replaced by other memory reference traffic between the misses.

Figure 3:
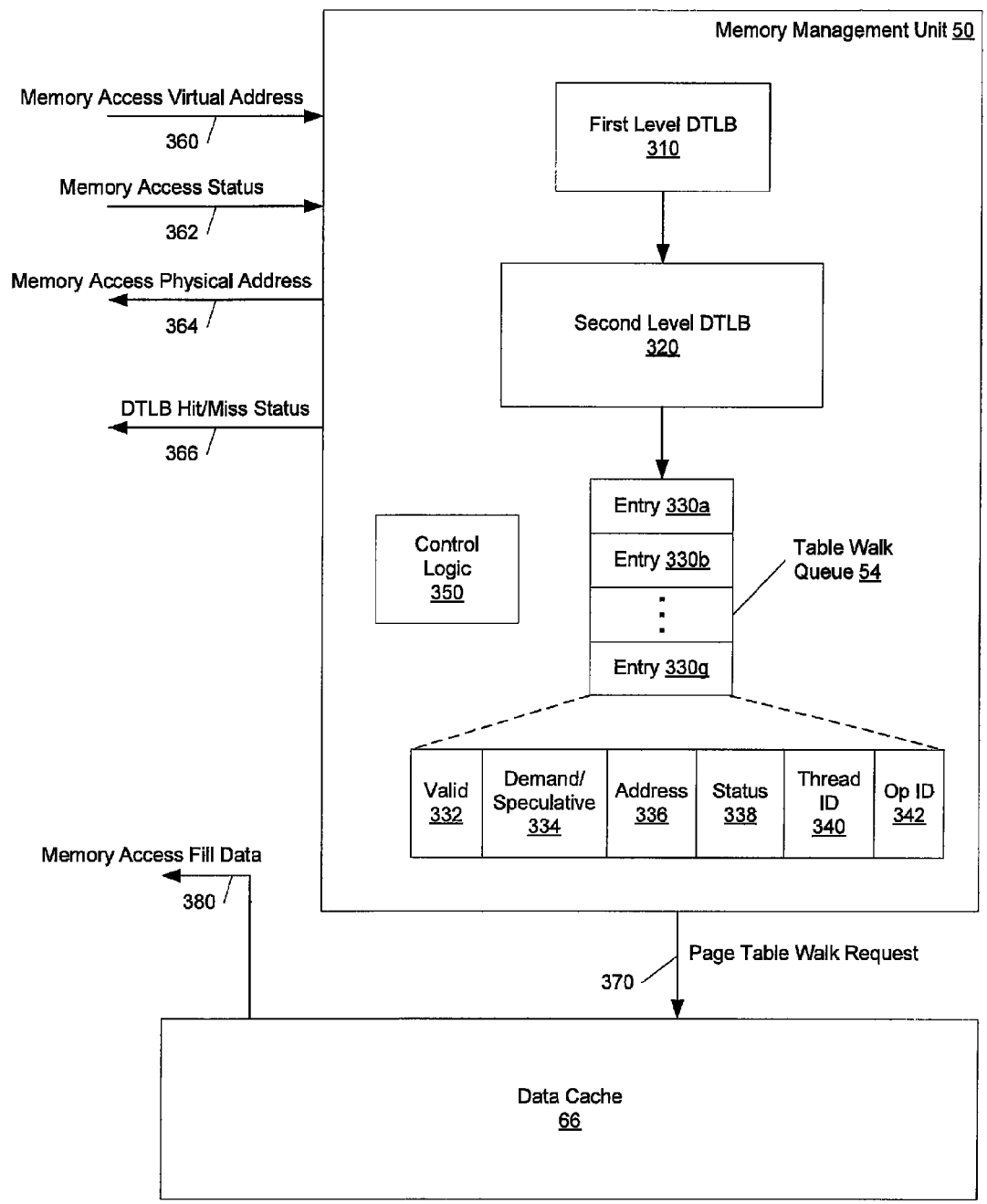
FIG. 3 is a generalized block diagram illustrating one embodiment of a memory management unit queuing page table walk requests.

Referring now to FIG. 3, a generalized block diagram illustrating one embodiment of a memory management unit queuing page table walk requests is shown. A memory management unit (MMU) may include one or more levels of a data translation-lookaside-buffer (DTLB). As shown, the MMU 50 includes a first-level DTLB 310 and a second-level DTLB 320. In another embodiment, the first-level DTLB may be placed in the LSU 60. The MMU 50 may receive one or more memory access virtual addresses. For ease of illustration, a single memory access virtual address 360 is shown. The memory access virtual address 360 may be associated with a memory access operation selected within the scheduler 20 to be issued for execution.

Associated memory access status information 362 may be provided. The status information may indicate whether the associated memory access operation is speculative or non-speculative. As can be appreciated, not waiting for a conditional operation to be resolved prior to executing subsequent operations results in greater performance. The conditional operation may be a conditional control flow instruction such as a branch instruction, a load operation with store-to-load forwarded data, or other. Due to the advantages, many modern chip designs perform multiple operations within a clock cycle, perform out-of-order execution and speculatively execute operations. If the conditional operation is found later to be correct, then the speculatively executed instructions are committed to memory, i.e., the speculative instructions are "retired". If the conditional operation is found later to be incorrect, then the speculatively executed instructions are flushed from the pipeline and may be later replayed.

Although speculative, out-of-order processing of operations typically has considerable advantages, a page table walk process performed in such an environment may greatly reduce performance of memory access operations. When a speculative memory access operation misses in each of the available DTLBs, the resulting speculative page table walk may interfere with other memory access operations. These other memory access operations may have hit within one of the available DTLBs and one or more of these other memory access operations may be non-speculative. The speculative page table walk may consume resources such as buses, ports and buffer entries, such as miss request buffer entries for a L2 or other level of cache.

One or both of the DTLBs 310 and 320 may be indexed with the received memory access virtual address 360. If a hit occurs within either of the DTLBs 310 and 320, then the resulting translated physical address 364 may be returned with a DTLB hit status 366. If the memory access virtual address 360 misses in each of the available DTLBs 310 and 320, then the miss status in the status information 366 may be sent to both the scheduler 20 and also to the control logic 350.

The control logic 350 may allow speculative table walk (TW) requests to be stored in the TW queue 54 when a qualified condition occurs. This qualified condition may occur when the control logic 350 within the MMU 50 determines low utilization of the memory subsystem resources. For example, non-speculative memory access operations may not currently be using the buses, ports, miss buffer entries and other resources of the memory subsystem. In one embodiment, the control logic 350 determines this qualified condition occurs when a received virtual address is associated with an oldest, outstanding (uncompleted) memory access operation stored in the scheduler 20. This information may be included with the memory access status 362.

When the control logic 350 determines the qualified condition occurs, the control logic 350 may store a demand page table walk (TW) request in one of the entries 330a-330g within the page table walk queue 54 for the received virtual address corresponding to the oldest memory access operation. When the associated memory access request is the oldest, uncompleted memory access operation in the scheduler 20, the memory access bandwidth to the data cache 66 and other lower levels of memory in addition to resource use of associated buses, ports, other buffers and so forth may be greatly reduced. With lighter memory reference traffic, the control logic 350 may attempt to take advantage and begin storing speculative page table walk requests after the demand table walk request is stored.

When a speculative memory access operation is issued from the scheduler 20 and it has its virtual address miss in each of the available DTLBs 310 and 320, the control logic 350 determines whether to allocate an entry in the TW queue 54 to store a speculative table walk (TW) request. When the control logic 350 determines a demand TW request is stored in the table walk (TW) queue 54, the control logic may allocate one of the entries 330a-330g to store a speculative table walk request for the speculative memory access operation issued from the scheduler 20. Again, in one embodiment, the demand TW request stored in the TW queue 54 may be associated with the oldest, uncompleted memory access operation in the scheduler 20 that has a virtual address that previously missed in each of the available DTLBs 310 and 320. In one embodiment, the control logic 350 may maintain a limit of M speculative TW requests to be stored in the TW queue 54 at any given time. In one embodiment, the value M may be an integer value of 3. Other integer values are possible and contemplated.

In one embodiment, the data cache 66 stores two page table entries per cache line. The two page entries may be associated with a same page table. Both table entries may be retrieved during a page table walk process. Therefore, a smaller number of transactions may be used to load a page into one or more of the available DTLBs 310 and 320. Alternatively, the two page table entries may be associated with separate page tables. These separate page tables may be two contiguous page tables. Again, both table entries may be retrieved during a page table walk process. Therefore, a prefetched speculative page table entry may accompany the designated speculative page table entry during retrieval from the data cache 66. Two page tables may then be retrieved during the speculative page table walk process.

Continuing with a description of retrieving multiple page table entries from a single cache line during a page table walk process, in an embodiment wherein the control logic 350 may additionally maintain a limit of M speculative TW requests to be stored in the TW queue 54 at any given time, there may be P×M+(P−1) speculative prefetched entries brought into one or more of the DTLBs 310 and 320. Here, P is a number of page table entries stored in a single cache line. Again, M is a limit of speculative TW requests to be stored in the TW queue 54 at any given time. For example, when M has a value of 3 and P has a value of 2, one non-speculative page table may be retrieved corresponding to the demand TW request. Additionally, (P−1), or 1 additional speculative page table may be retrieved corresponding to the demand TW request. Further, P×M, or 6 additional speculative page tables may be retrieved corresponding to the M, or 3, allowed speculative TW requests following the demand TW request.

Each of the demand TW request and the M allowed speculative TW requests may be sent via line 370 to the data cache 66 or a corresponding cache controller (not shown). The line 380 may be used to fill memory access operations that hit in one of the available DTLBs 310 and 320. When a received virtual address associated with a speculative memory access operation misses in each of the available DTLBs 310 and 320, and the control logic 350 determines a demand TW request is stored in the TW queue 54 and further determines the limit of M speculative TW requests stored in the TW queue 54 is reached, the control logic 350 may set an indication for a later translation retry for the speculative memory access operation. No entry in the TW queue 54 is allocated to store a speculative TW request for the associated speculative memory access operation. The scheduler 20 may receive this indication and use it to determine when to reissue the speculative memory access operation at a later time.

When a received virtual address associated with a speculative memory access operation misses in each of the available DTLBs 310 and 320, and the control logic 350 determines a demand TW request is not stored in the TW queue 54, the control logic 350 may set an indication for a later translation retry for the speculative memory access operation. No entry in the TW queue 54 is allocated to store a speculative TW request for the associated speculative memory access operation. The scheduler 20 may receive this indication and use it to determine when to reissue the speculative memory access operation at a later time.

In one embodiment, the TW queue 54 stores a limit of one demand TW request at any given time. When a received virtual address associated with a non-speculative memory access operation misses in each of the available DTLBs 310 and 320, and the control logic 350 determines a demand TW request is stored in the TW queue 54, the control logic 350 may set an indication for a later translation retry for the non-speculative memory access operation. No entry in the TW queue 54 is allocated to store a non-speculative TW request for the associated non-speculative memory access operation. The scheduler 20 may receive this indication and use it to determine when to reissue the non-speculative memory access operation at a later time.

In one embodiment, each one of the entries 330a-330g includes multiple fields. For example, a valid field 322 may indicate whether a corresponding entry is allocated and stores a valid TW request. A demand/speculative field 324 may indicate whether a corresponding memory access operation is speculative or associated with a demand type. In one embodiment, a demand type, as described earlier, may a memory access operation that is currently the oldest, uncompleted memory access operation stored in the scheduler 20. Other definitions for a demand type may be used. A non-speculative type outside of a demand type may be indicated if that type is supported in the page table walk scheme.

An address field 326 may store a virtual address to be translated. A status field 338 may include age and other information used to characterize the corresponding memory access operation that is not already stored in the entry. A thread identifier (ID) and an operation ID, such as an opcode, may be stored in fields 340 and 342. Additional or less fields may be used within each of the entries 330a-330g. The fields may be stored in a different order as shown for better design tradeoffs.

Figure 4:
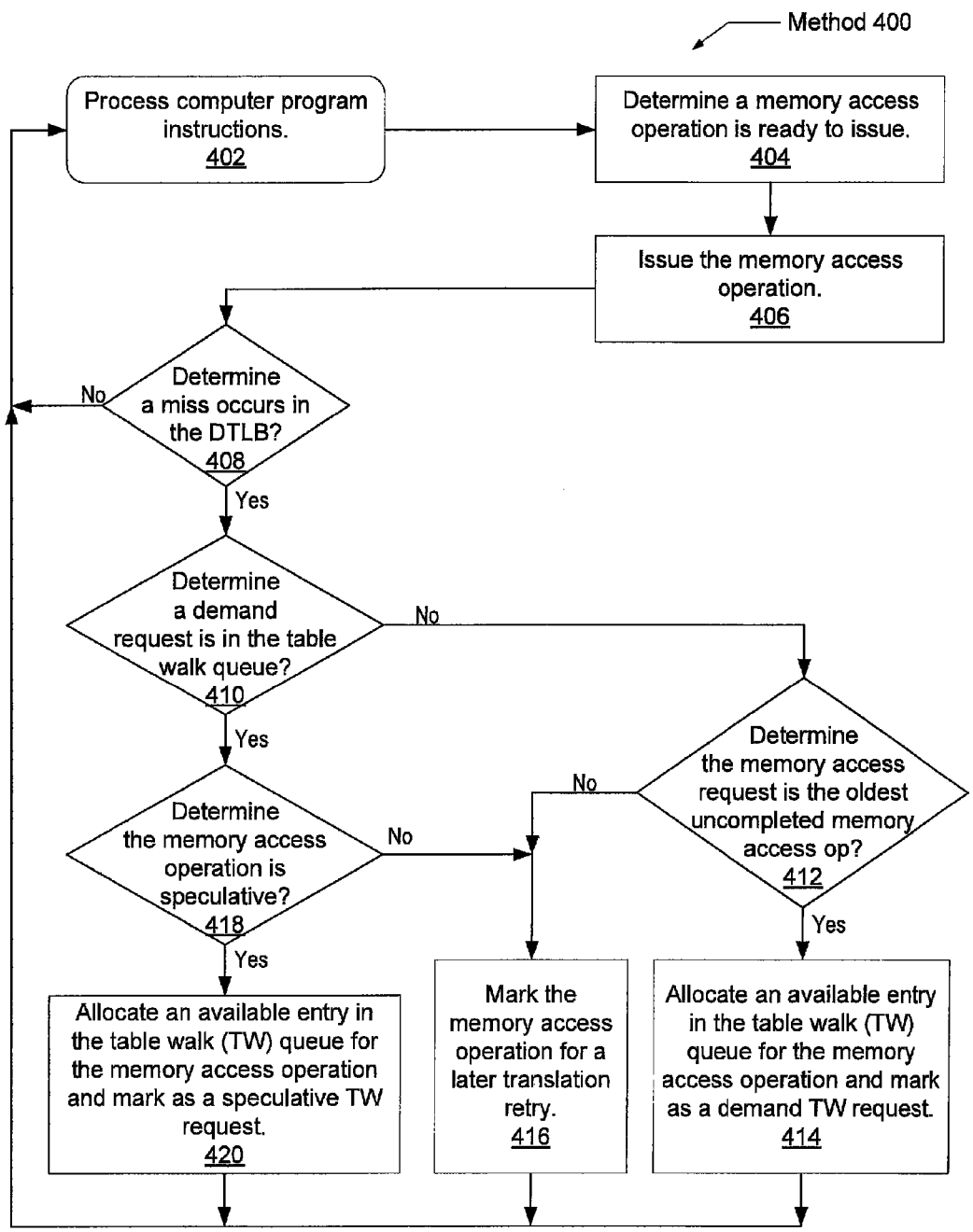
FIG. 4 is a generalized flow diagram illustrating one embodiment of a method for allocating page table walk requests in entries of a page table walk queue.

Turning now to FIG. 4, a generalized flow diagram of one embodiment of a method 400 for allocating page table walk requests in entries of a page table walk queue is shown. Method 400 may be modified by those skilled in the art in order to derive alternative embodiments. Also, the steps in this embodiment are shown in sequential order. However, some steps may occur in a different order than shown, some steps may be performed concurrently, some steps may be combined with other steps, and some steps may be absent in another embodiment.

In the embodiment shown, instructions of a computer program are processed in block 402. The instructions may be fetched from memory, decoded and executed as described earlier. In block 404, a memory access operation is ready to issue. A scheduler 20 may determine the memory access operation is ready to issue. In block 406, the scheduler 20 may issue the memory access operation and send an associated virtual address to at least one of the LSU 60 and the MMU 50. The virtual address may be used to index one or more available DTLBs. A DTLB miss may occur for each of the available DTLBs and this condition is detected by at least the MMU 50. If this condition does not occur (conditional block 408), then control flow of method 400 returns to block 402. If this condition does occur (conditional block 408), then the MMU 50 or other logic may determine whether a demand TW request is in the TW queue 54.

If a demand TW request is not in the TW queue 54 (conditional block 410), then the MMU 50 or other logic may determine whether the memory access operation is the oldest, uncompleted memory access operation in the scheduler 20. If the memory access operation satisfies this condition, then low utilization of the memory subsystem resources may occur. Additionally, if the memory access operation satisfies this condition (conditional block 412), then in block 414, an available entry in the table walk (TW) queue may be allocated for the memory access operation. The entry may be marked as a demand TW request. If the memory access operation does not satisfy this condition (conditional block 412), then in block 416, the memory access operation may be marked for a later translation retry. An indication may be sent to the scheduler 20 regarding this later translation retry.

If a demand TW request is in the TW queue 54 (conditional block 410), then the MMU 50 or other logic may determine whether the memory access operation is speculative. An indication may be stored in the scheduler 20 and this indication may be sent to the MMU 50. If the memory access operation is speculative (conditional block 418), then an available entry in the table walk (TW) queue may be allocated for the memory access operation. The entry may be marked as a speculative TW request. However, an available entry in the TW queue 54 may not be found. The TW queue may be full. For example, the TW queue may currently store the demand TW request and a limit of M speculative TW requests. If the TW queue is full, then the memory access operation may be marked for a later translation retry. An indication may be sent to the scheduler 20 regarding this later translation retry. Similarly, if the memory access operation is non-speculative (conditional block 418), then the memory access operation may be marked for later translation retries.

Figure 5:
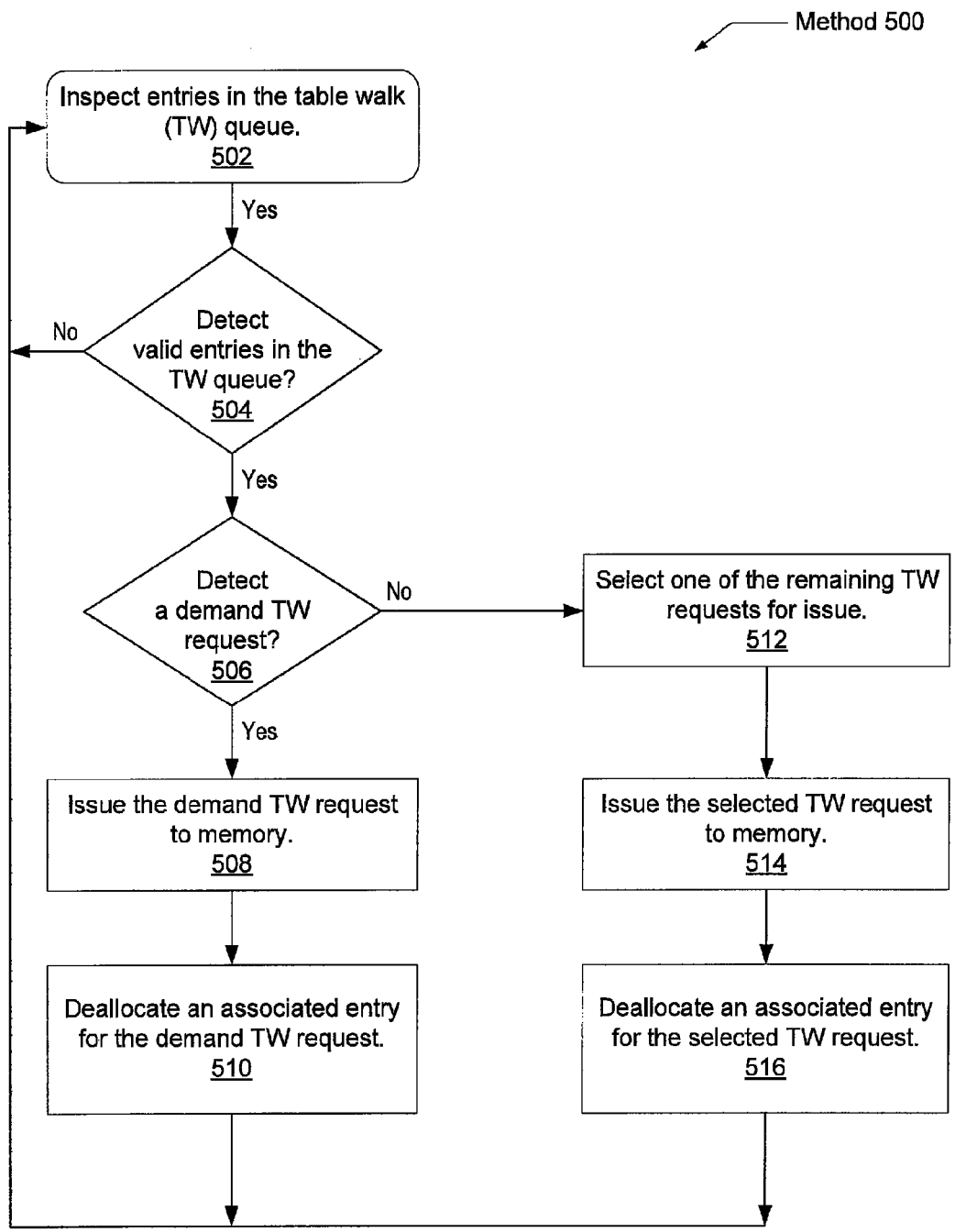
FIG. 5 is a generalized flow diagram illustrating one embodiment of a method for issuing page table walk (TW) requests from a TW queue.

Turning now to FIG. 5, a generalized flow diagram of one embodiment of a method 500 for issuing page table walk (TW) requests from a TW queue is shown. Method 500 may be modified by those skilled in the art in order to derive alternative embodiments. Also, the steps in this embodiment are shown in sequential order. However, some steps may occur in a different order than shown, some steps may be performed concurrently, some steps may be combined with other steps, and some steps may be absent in another embodiment.

In block 502, the entries in the table walk (TW) queue 54 may be inspected. For example, control logic 350 within the MMU 50 may monitor the entries. If one or more valid entries are detected (conditional block 504), and a demand TW request is stored in the TW queue (conditional block 506), then in block 508, the demand TW request may be issued to memory. Other factors such as the availability of memory subsystem resources may determine when any TW request is issued from the TW queue to memory. However, when a demand TW request is stored, low utilization of the memory subsystem resources may occur. In block 510, an associated entry for the demand TW request may be deallocated from the TW queue.

If one or more valid entries are detected (conditional block 504), and a demand TW request is not stored in the TW queue 54 (conditional block 506), then in one embodiment, the TW queue 54 stores one or more speculative TW requests. In block 512, the control logic 350 may select one of the remaining TW requests in the TW queue for issue. In one embodiment, the control logic 350 determines which stored TW request is the oldest TW request. In one embodiment, the remaining TW requests are speculative since the demand TW request has already issued. The oldest speculative TW request may be selected for issue. In one embodiment, age of the stored TW requests is associated with program order in the computer program. In another embodiment, age of the stored TW requests is associated with a time of allocation into the TW queue 54. In yet other embodiments, other criteria in addition to or in place of age may be used to select a next TW request to issue.

In block 514, the selected TW request may be issued to memory. Again, other factors such as the availability of memory subsystem resources may determine when any TW request is issued from the TW queue to memory. However, when a demand TW request is stored, low utilization of the memory subsystem resources may occur. The demand TW request may have been issued, but the utilization of the memory subsystem resources may still be low for some time afterward. In block 516, an associated entry for the selected TW request may be deallocated from the TW queue.

As described earlier, a time when utilization of memory subsystems resources is determined to be low is when an oldest, uncompleted memory access operation is issued from the scheduler. In another embodiment, a limit N of a number of non-speculative TW requests to store in the TW queue may be greater than one. For example, pre-silicon and/or post-silicon simulations of a chip may find utilization of memory subsystems resources is still low when two non-speculative TW requests are stored in the TW queue. Therefore, the limit N may be raised from 1 to 2 non-speculative TW requests in the TW queue.

Continuing with the embodiment with multiple non-speculative TW requests stored in the TW queue, a further qualifying condition may limit the two non-speculative TW requests to be associated with the two oldest, uncompleted non-speculative memory access operations stored in the scheduler 20. The oldest memory access operation is non-speculative by definition. The second oldest memory access operation stored in the scheduler 20 may have status information inspected to determine it is too non-speculative. When there are multiple non-speculative TW requests in the TW queue, an order of issue from the TW queue to begin a corresponding page table walk process may be based on in-program-order age, age of being allocated in the TW queue, or other factors selected for best design tradeoffs.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor comprising:
a memory configured to store a page table which includes address translations; and
a memory management unit (MMU) comprising a translation-lookaside-buffer (TLB) and a table walk (TW) queue having a plurality of entries;
wherein the MMU is configured to:
detect a miss in the TLB for a received first memory access operation;
determine the first memory access operation is speculative;
allocate a speculative TW request in an entry of the plurality of entries for the first memory access operation, in response to determining at least one entry in the TW queue stores a non-speculative TW request; and
set an indication for a later translation retry for the first memory access operation, in response to determining no entries of the TW queue store a non-speculative TW request.

2. The processor as recited in claim 1, wherein the MMU is further configured to limit a number of non-speculative TW requests stored in the TW queue to N, wherein N is an integer greater than zero.

3. The processor as recited in claim 2, wherein the MMU is further configured to allocate a non-speculative TW request for a received second memory access operation in response to determining:
the second memory access operation is one of N oldest non-speculative uncompleted memory access operations in the processor; and
each memory access operation older in-program-order than the second memory access operation already had a non-speculative TW request stored in the TW queue.

4. The processor as recited in claim 3, wherein in response to detecting at least one of said determinations is false, the MMU is further configured to set an indication for a later translation retry for the second memory access operation.

5. The processor as recited in claim 2, wherein in response to determining a received second memory access operation that misses in the TLB is one of N oldest non-speculative uncompleted memory access operations in the processor, the MMU is further configured to allocate a non-speculative TW request in an entry of the plurality of entries for the second memory access operation.

6. The processor as recited in claim 5, wherein the MMU is further configured to issue non-speculative TW requests before speculative TW requests from the TW queue to the page table stored in memory.

7. The processor as recited in claim 6, wherein the MMU is further configured to issue speculative TW requests from the TW queue in a first-in-first-out order in relation to one another.

8. The processor as recited in claim 5, wherein the MMU is further configured to set N to a value of 1 to associate a non-speculative TW request stored in the TW queue with an oldest uncompleted memory access operation in the processor.

9. A method comprising:
   storing address translations in a page table;
   storing a subset of the address translations in a translation-lookaside-buffer (TLB);
   determining a miss occurs in the TLB for a received first memory access operation;
   determining the first memory access operation is speculative;
   allocating a speculative TW request in an entry of a plurality of entries in a table walk (TW) queue for the first memory access operation, in response to determining at least one entry of the plurality of entries stores a non-speculative TW request for a non-speculative memory access operation; and
   setting an indication for a later translation retry for the first memory access operation, in response to determining no entries of the plurality of entries stores a non-speculative TW request for a non-speculative memory access operation.

10. The method as recited in claim 9, further comprising limiting a number of non-speculative TW requests stored in the TW queue to N, wherein N is an integer greater than zero.

11. The method as recited in claim 10, further comprising allocating a non-speculative TW request in an entry of the plurality of entries for a received second memory access operation, in response to:
   determining the second memory access operation is one of N oldest non-speculative uncompleted memory access operations in a processor; and
   determining each memory access operation older in-program-order than the second memory access operation already had a non-speculative TW request stored in the TW queue.

12. The method as recited in claim 11, wherein in response to detecting at least one of said determinations is false, the method further comprises setting an indication for a later translation retry for the second memory access operation.

13. The method as recited in claim 10, wherein in response to determining a received second memory access operation that misses in the TLB is one of N oldest non-speculative uncompleted memory access operations in a processor, the method further comprises allocating a non-speculative TW request in an entry of the plurality of entries for the second memory access operation.

14. The method as recited in claim 13, further comprising issuing non-speculative TW requests before speculative TW requests from the TW queue to the page table stored in memory.

15. The method as recited in claim 14, further comprising issuing speculative TW requests from the TW queue in a first-in-first-out order in relation to one another.

16. The method as recited in claim 13, further comprising setting N to a value of 1 to associate a non-speculative TW request stored in the TW queue with an oldest uncompleted memory access operation in the processor.

17. A memory management unit (MMU) comprising:
   a first interface to a data cache storing a page table which includes address translations;
   a second interface to a load store unit (LSU) configured to receive memory access requests;
   a translation-lookaside-buffer (TLB) configured to store a subset of the address translations in the page table;
   a table walk (TW) queue comprising a plurality of entries, each entry configured to store a TW request to the page table; and
   control logic, wherein the control logic is configured to:
      determine each of a received first memory access operation and a second memory access operation miss in the TLB;
      allocate a demand TW request in an entry of the plurality of entries for the first memory access operation, in response to determining the first memory access operation is an oldest uncompleted memory access operation in a processor; and
      set an indication for a later translation retry for the second memory access operation, in response to determining the second memory access operation is speculative and no entries of the plurality of entries stores a demand TW request.

18. The MMU as recited in claim 17, wherein in response to determining the second memory access operation is speculative and one of the plurality of entries stores a demand TW request, the control logic is further configured to allocate a speculative TW request in an entry of the plurality of entries for the second memory access operation.

19. The MMU as recited in claim 17, wherein in response to determining the second memory access operation is non-speculative and one of the plurality of entries stores a demand TW request, the control logic is further configured to set an indication for a later translation retry for the second memory access operation.

20. The MMU as recited in claim 19, wherein in response to determining the second memory access operation is non-speculative and no entries of the plurality of entries stores a demand TW request, the control logic is further configured to:
   determine the second memory access operation is not an oldest uncompleted memory access operation in a processor; and
   set an indication for a later translation retry for the second memory access operation, in response to said determination.

21. The MMU as recited in claim 19, wherein in response to allocating an entry of the plurality of entries with a demand or a speculative TW request, the control logic is further configured to indicate within the TW request a page in the page table next to a page associated with the demand or speculative TW request is to also be returned.

22. The MMU as recited in claim 21, wherein a cache line in the data cache stores two page table entries of two separate page tables.

23. The MMU as recited in claim 19, wherein in response to allocating an entry of the plurality of entries with a demand or a speculative TW request, the control logic is further configured to generate an additional speculative TW request to be allocated in the TW queue.

24. The MMU as recited in claim 19, wherein the control logic is further configured to issue a demand TW request before speculative TW requests from the TW queue to the page table.

25. An apparatus comprising:
   a first data storage including address translations;
   a second data storage including a subset of the address translations;
   a queue comprising a plurality of entries, each entry configured to store a request to read data from the first data storage; and
   control logic, wherein the control logic is configured to:

determine each of a received first memory access operation and a second memory access operation miss in the second data storage;

in response to determining the first memory access operation is an oldest uncompleted memory access operation of all memory access operations being processed, allocate a demand request in an entry of the plurality of entries for the first memory access operation; and in response to determining the second memory access operation is speculative and no entries of the plurality of entries stores a demand request, set an indication for a later translation retry for the second memory access operation.

* * * * *